United States Patent [19]
Burtscher et al.
[11] 3,716,911
[45] Feb. 20, 1973

[54] METHOD OF PRODUCING SMALL AREA SEMICONDUCTOR COMPONENTS

[75] Inventors: Joachim Burtscher, Munich; Reimer Emeis, Ebermannstadt; Adolf Herlet, Baldham, all of Germany

[73] Assignee: Siemens Aktiengesellschaft, Berlin and Munich, Germany

[22] Filed: June 15, 1970

[21] Appl. No.: 46,216

[30] Foreign Application Priority Data

June 20, 1969 Germany.....................P 19 31 336.1

[52] U.S. Cl.........................................29/578, 29/583
[51] Int. Cl...............................................B01j 17/00
[58] Field of Search.........29/577, 580, 583, 589, 578

[56] References Cited

UNITED STATES PATENTS

| | | | |
|---|---|---|---|
| 2,910,766 | 11/1959 | Pritikin | 29/589 UX |
| 3,187,403 | 6/1965 | Ohntrup | 29/578 |
| 3,449,825 | 6/1969 | Loro | 29/580 X |
| 3,590,478 | 7/1971 | Takehana | 29/583 X |

*Primary Examiner*—Richard J. Herbst
*Assistant Examiner*—W. T. Tupman
*Attorney*—Curt M. Avery, Arthur E. Wilfond, Herbert L. Lerner and Daniel J. Tick

[57] ABSTRACT

Method of producing small area semiconductor components with a sequence of at least three mutually parallel zones of alternating conducted type. The following steps are sequentially executed:

a. The same zone sequence is first produced in a large area semiconductor wafer, as in a small area semiconductor component, with the zones parallel to the main surface of the semiconductor wafer and with pattern like break-throughs in an outer zone, at one surface, wherein the adjacent inner zone emerges to the surface;

b. The boundary lines of the pattern like breakthroughs are subsequently masked at least over one length portion, on the main surface of the semiconductor wafer;

c. The unmasked parts of this surface, are thereafter, provided with a metal cover; and d. the components are cut out of the semiconductor wafer.

3 Claims, 12 Drawing Figures

METHOD OF PRODUCING SMALL AREA SEMICONDUCTOR COMPONENTS

Our invention relates to a method for producing small area semiconductor circuit components having a sequence of at least three parallel zones of alternating conductance type.

Semiconductor components are being used at an increasing rate in industrial and non-industrial electrical appliances, such as kitchen appliances. The power consumption of these appliances is rather low, so that rather small semiconductor components are adequate. In particular, small area transistors and thyristors are required for controlling these appliances.

The use of small area semiconductor components in electrical appliances, and the large number in which they are produced permit particularly economical mass production methods. These production methods, however, must result in products whose quality and characteristics data deviate as little as possible from the quality and characteristic date of semiconductor components, which are produced, with great care, in small numbers.

The adjustment of the current amplifying gain is particularly important for transistors. This factor is known to be reducible through a shunt which bridges the p-n junction between the emitter and the base region. Such a shunt is also utilized for stabilizing the operation of thyristors. In thyristors, this shunt bridges the *p-n* junction between the base region provided with the control electrode and the adjacent emitter region and thus reduces the current amplification of the transistors, which is assumed to be composed of the emitter region and the two base regions. This prevents a premature firing of the thyristor at low voltages in the forward direction even if the thyristor during operation, obtains a high temperature. The shunt also prevents the thyristor from firing spontaneously in the forward direction, when the voltage rise occurs too quickly.

The object of our invention is to economically mass produce small area semiconductor components. In particular we simplify the application of contact electrodes, and, a metallic shunt at an emitter p-n junction, on the surface of the semiconductor body. We achieve this by the following method steps:

a. The same zone sequence in a large area semiconductor wafer is produced, as in the small area semiconductor components, with parallel regions to the main surface of the semiconductor wafer and with pattern like break-throughs in one outer zone, one surface wherein the adjacent inner region emerges to the surface;

b. subsequently masking the boundary lines of the pattern like break-throughs on the main surface of the semiconductor wafer, at least over the length of one component;

c. providing unmasked parts of this surface with a metal covering; and d. finally cutting the components out of the semiconductor wafer.

A particularly simple method of production is by producing in the semiconductor wafer, an outside region with break throughs in form of mutually separated and mutually parallel strips, by alternately masking the edge lines of these strip like break-throughs and by dividing the semiconductor wafer into elongated bodies, through sections which are so placed between the boundary lines of the strip like break throughs so that they run on the recesses, even through the metal covering.

The invention will be described in greater detail with reference to the drawing, wherein.

Figure 1:
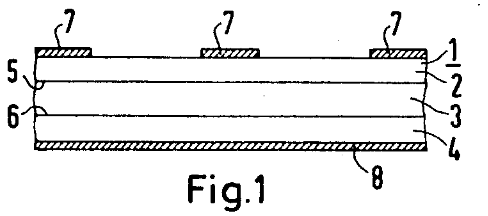
FIGS. 1 to 4 and 6 and 7 illustrate sections perpendicular to the main surfaces of a monocrystalline silicon wafer during various method steps.

In FIG. 1, the silicon wafer 1 contains a sequence of three mutually parallel zones 2, 3 and 4 of alternating conductivity type having *p-n* junctions 5 and 6 parallel to the main surface of the wafer. In this example, the middle zone 3 is n-conducting while both outer zones 2 and 4, are p-conducting.

The wafer, with three zones in FIG. 1, is obtained from an original wafer which was severed from a rod shaped silicon monocrystal, produced for example, by crucible-free zone melting, and uniformly doped with phosphorus. As a result the wafer was *n*-conducting. The thickness of the wafer may amount to approximately 300 micron and its diameter to 3 cm. Thereafter, *p*-conducting zones 2 and 4 were produced, in a conventional manner, within the original wafer, through an all over indiffusion of acceptor material, such as for example gallium or aluminum.

The surface of the silicon wafer was then treated in a quartz tube in the presence of oxygen and water vapor, at a temperature of 1,100°C, for approximately 3 hours. This resulted in the formation of a silicon dixoide coating on the wafer surface.

Following this, strip-like recesses were produced in the silicon dixoide coating, on the main surface of the silicon wafer 1, by using the known photo-resist method or photolithographic technique. The silicon dioxide, in these recesses, is completely removed from the surface of this main surface so that this main surface will then contain only mutually parallel strips 7 of silicon dioxide. The strip-like recesses may be produced according to coassigned application Ser. No. 818,371 of Emeis et al. filed Apr. 22, 1969 with a stamping plate of an etching resistant synthetic plastic material such as polyvinylchloride. This stamping plate has a strip-like pattern which bears with its raised parts on the silicon dioxide coating and which covers the main surface of the silicon wafer at the bearing surfaces. The space between the raised parts of the pattern was filled with an echant, such as hydrofluoric acid or hydrofluoric acid vapor, which attacks the silicon dixoide coating. The lower main area of the silicon wafer 1 remained covered with a closed silicon dioxide coating 8.

Thereafter, a phosphorus glass layer 9 (FIG. 2) was produced on the surface of the silicon wafer 1. To this end, the silicon wafer was heated in an open quartz tube for 1½ hours to a temperature of 1,150°C, in a gas current composed of nitrogen ($N_2$), oxygen ($O_2$) and phosphorus oxychloride ($POCl_3$).

Figure 2:
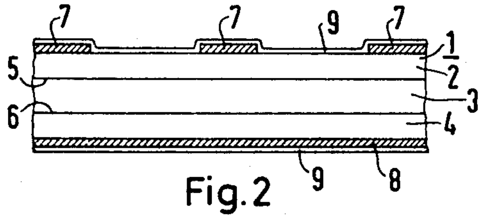
Figure 3:
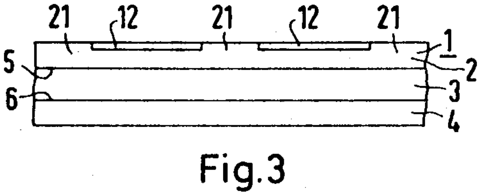
Figure 4:
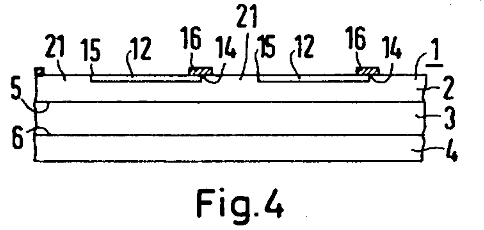

The silicon wafer 1 of the embodiment shown in FIG. 2, was then heated in air, to a temperature of 1,200°C, for 6 hours. Phosphorus thereby diffused into the silicon wafer 1 at the places of the upper main surface not covered by the silicon dixoide strips 7. Etching with hydrofluoric acid removed the phosphorus glass layer 9 and the silicon dioxide coverings 7 and 8, from the surface of the silicon wafer 1. FIG. 3 shows that the upper main surface of the silicon wafer 1 contains an n-conducting outer zone 12 broken through by a plurality of mutually separated and mutually parallel strips 21, where the adjacent inner zone 2 emerges to the surface.

The boundary lines of the strip like breakthroughs 21, in the outer zone 12, on the upper main surface of the silicon wafer 1, was then alternately covered with parallel varnish strips 16, i.e. every other boundary line 14 was covered with a strip of varnish 16, while the boundary lines 15, on both sides of the boundary line 14, are exposed.

Figure 5:
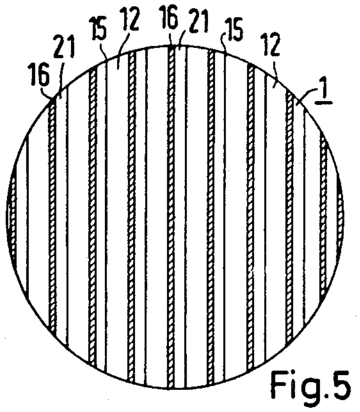
FIG. 5 shows a top view upon the silicon wafer of FIG. 4.

FIG. 5 illustrates the upper main surface of the silicon wafer 1 with the varnish strips 16, the strip-like outer zone 12, the strip like break-throughs 21 and the uncovered boundary lines 15 of the break throughs 21.

The varnish strips 16 may be produced according to the screen printing method. Preferably, the varnish strips may also be produced using a stamping body which is dipped into liquid varnish. The varnish strips 16 preferably consist of an asphalt varnish.

Figure 6:
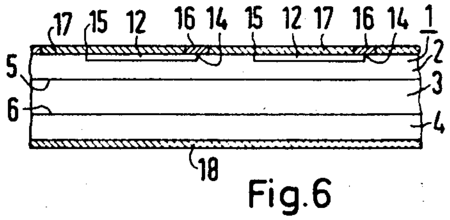

After the varnish strips 16 were applied, the unmasked surface portions of the silicon wafer 1, as shown in FIG. 6, was coated with metal covers 17 and 18, for example, consisting of nickel. This can be done in a known manner, by vapor deposition or electrolytical deposition of the metal.

To apply a nickel coating upon the unmasked surface parts of the silicon wafers, the latter may be treated in a known manner in a nickel plating solution (currentless nickel plating) which does not attack the asphalt strips. Suitable aqueous nickel plating solutions are those which contain nickel and hypophosphite ions. Such solutions may contain, for example, 30 g/liter nickel chloride and 10 g/liter sodium hypophosphite. Prior to the nickel plating process, enough ammonia ($NH_3$) was added to the solution to give it a pH of 8. Moreover, it was heated to about 95°C. The processing period was about 3 to 5 minutes. Following the nickel plating, the varnish strips 16 were removed with carbon tetrachloride.

Figure 7:
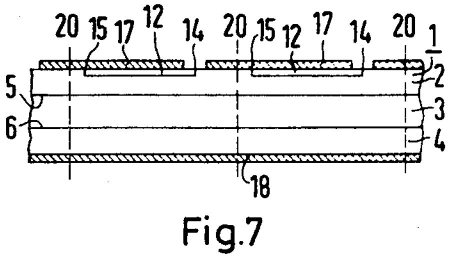

FIG. 7 shows the silicon wafer 1, following the removal of the varnish strip 16. It now has on its upper main surface strip-like metal coatings, which alternately cover the boundary lines, toward the boundary lines 14, 15 of the strip-like break throughs in the outer zone 12. That is, the boundary lines 15 are now covered with the metal strips 17, while the boundary lines 14, originally covered by the varnish strips 16, are exposed. At its bottom surface, the silicon wafer of FIG. 7 has a coherent metal coating 18, at the *p*-conducting zone 4. Thereafter, the silicon wafer 1 was divided into elongated bodies by sections along the separating plane 20, which run through the strip-like break-throughs 21 of the outer zone 12, and into the metal strips 17 coating said break-throughs, extending perpendicularly to the main surfaces of the silicon wafer and in parallel to the boundary lines 14, 15 of the recesses 21. The sectionizing can, for example, be achieved by etching with a mixture of hydrofluoric acid and nitric acid, after previous masking of the silicon wafers. The separation of the elongated bodies from the silicon wafer can also be effected through sand blasting. Here, the silicon wafer is glued with one surface on a grid while the opposite surface is sprayed with a sand blast, from a nozzle across a slot in the bearing surface of the grid. A relative movement between nozzle and grid, helps to place a separating cut extending along the slot, at the desired location of the silicon wafer. The sand was suctioned off from said slot in the grid.

Figure 8:
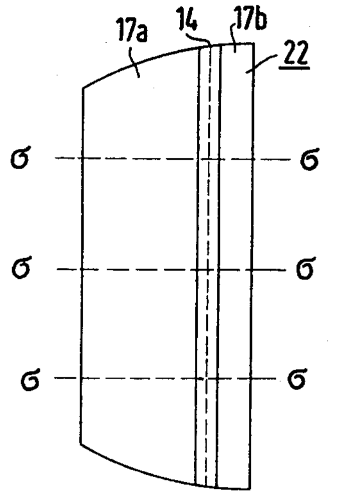
FIG. 8 shows a top view upon an elongated silicon body, which was obtained by the step shown in FIG. 7.

FIG. 8 shows the top view upon elongated silicon body 22 severed from the silicon wafer 1. The upper surface of this elongated body 22 has a wide metal coating **17*a* and a narrow coating 17*b*. Between both metal coatings is an uncovered line 14 of a strip like break through, in the original outer zone 12. Sections $\sigma\sigma$ are cut through the elongated body 22, perpendicularly to the straight line edges of the elongated body 22**, by an etching process or by sand blasting.

Figure 9:
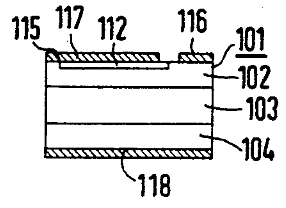
FIG. 9 shows a section through a thyristor separated from silicon body according to FIG. 8.

This results in a plurality of silicon bodies 101, constituting a plurality of small thyristors, which when seen in side view perpendicular to sections $\sigma\sigma$, is shown in FIG. 9. These thyristors have a sequence of zones with alternately opposite conductance type 112, 102, 103 and 104 which run parallel to the silicon body 101. Zones 112 and 103 are *n*-conducting and zones 102 and 104 are *p*-conducting. At the lower surface of the silicon body 101, at emitter region 104, is a metallic contact electrode 118. At the upper surface, at emitter region 112, is a metallic contact electrode 117, which covers the *p-n* junction emerging at boundary line 115, between outer zone 112 and base zone 102 and partly covers base region 102. The metal electrode 117 thus effects the desired surface shunt between the emitter zone 112 and the base zone 102. The upper surface of the silicon body 101 also contains a narrow metal electrode 116, which barrier-free contacts the base zone 102, and which constitutes the control electrode of the thyristor.

Figure 10:
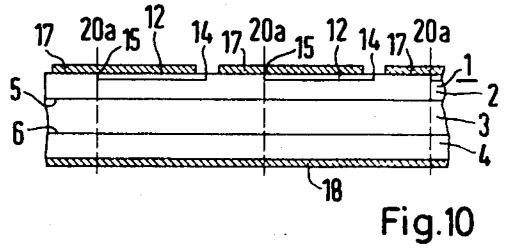
FIG. 10 illustrates a somewhat modified method step, taken in section of FIG. 7.

The separating planes through which the sections are guided through the silicon wafers according to FIG. 7, may run also along the boundary line of break throughs 21 in the outer zone 12 which covered by the metal strips 17. FIG. 10 shows the separating planes 20a which extend perpendicularly to the surfaces of the silicon wafer 1, and which run along the boundary lines 15. In FIG. 10 the same components are given the same reference numeral as in FIG. 7. The sections along the separating planes **20*a* in FIG. 10** divide the silicon wafer into elongated bodies wherefrom small thyristors without shunt may be produced between the base region provided with a control electrode and its adjacent emitter region, with the aid of sections perpendicular to the linear edges.

Figure 11:
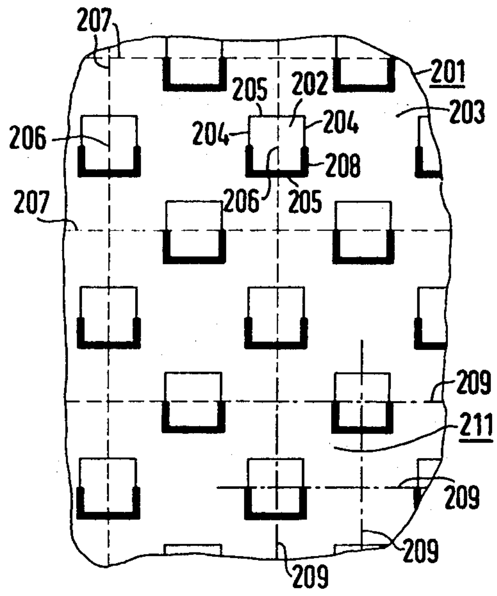
FIG. 11 shows a section from a surface of a silicon wafer produced in a somewhat modified embodiment.

FIG. 11 shows that a zone sequence can also be produced, in a large-area original silicon wafer 201 with break throughs in an outer zone 203 in form of squares 202 with equalateral lines 204 and 205. The diagonal intersecting points 206 of the square break-throughs 202 are located in the middle of the loop sides 207 of a net, on the main surface of the original wafer 201. These loop sides 207 have at least the double length, in FIG. 12 the triple length of a side line 204 or 205 of the square break throughs 202 and are cross-wise parallel to the side lines 204 and 205.

To produce the outside zone 203 provided with the square break throughs 202, the same method steps are used as in FIGS. 1 to 7. Following the production of the surface coating of silicon dioxide the latter is provided not with strip-like recesses but rather with such recesses so that the silicon dioxide pattern which remains on the main surface of the original silicon wafer, corresponds to the square break through 202. After the diffusion process and the complete removal of the silicon dioxide from the main surface, a side line and the halves adjacent the sideline of the two sidelines extending perpendicularly to this side line are masked with asphalt varnish, at the same places of the boundary lines of the square break throughs.In FIG. 11, the lower horizontal side line 205 of the break-throughs 202 and both adjacent vertical halves of side lines 204 are coated with a U-shaped strip 208 of asphalt varnish. Following the application of the metal coating and the removal of the asphalt varnish, the wafer shown in FIG. 11 is broken up into small bodies 211 by sections 209 shown by dot-dash lines, which are placed through the diagonal points of intersection 206 of the square break-through 202, in cross-wise parallel to the lateral lines 204 or 205 of the break through 202.

Figure 12:
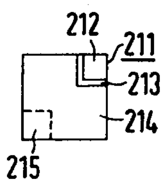
FIG. 12 shows the surface of a component separated from a silicon wafer of FIG. 11.

FIG. 12 shows a top view upon the main surface of a smaller silicon body 221 thus obtained, for example, a thyristor, with square base surface. This main area carries smaller area contact electrode 212, which is separated from the large area contact electrode, by a bevelled interspace 213. The contact electrode 214 contacts the outer zone situated at the illustrated main surface as well as at the break-through 215 (shown by dashs) of the inner zone adjacent the same outer zone and thus defines a surface short circuit between these two zones, while the contact electrode 212 contacts only the inner region which is adjacent to the outer region.

In place of an outer region having the strip or square shaped break through an outer zone can be produced, of semiconductor material, with pattern-like break-throughs of any desired shape, for example as rectangular or circular areas, at the respective surface of the original wafer, without departing from the general idea of the invention.

We claim:

1. In a method of producing thyristors with small area semiconductors, said small area semiconductor comprising at least three zones of alternating conductance type, by producing a plurality of parallel, strip-like zones of opposite conducting within one of the surface zones of a large area semiconductor body having at least three layers of alternating conductance type lying parallel to the surface of said large area semiconductor, whereby the lower-lying zone emerges to the surface between said strip-like zones, masking a portion of the width of said strip-like zones and a portion of the width of said lower-lying zone, coating the unmasked portions with a metal layer, removing the mask and separating the semiconductor body parallel to the strip-like zones, the improvement which comprises masking every other *p-n* junction positioned between a strip-like zone and the lower-lying zone while leaving the remaining junctions unmasked, applying the metal coating to said unmasked portions including said unmasked *p-n* junctions, and thereafter severing the metal coating and the semiconductor body between each pair of adjacent strip-like zones into strip-like semiconductor bodies having a discontinuous metal coating thereon.

2. The method of claim 1, wherein the strip-like semiconductor bodies are thereafter severed crosswise.

3. The method of claim 1, wherein the semiconductor wafer is severed along said unmasked *p-n* junctions.

* * * * *